Aug. 18, 1936.  J. B. ESTABROOK  2,051,205
INSULATING DEVICE
Filed Aug. 8, 1935
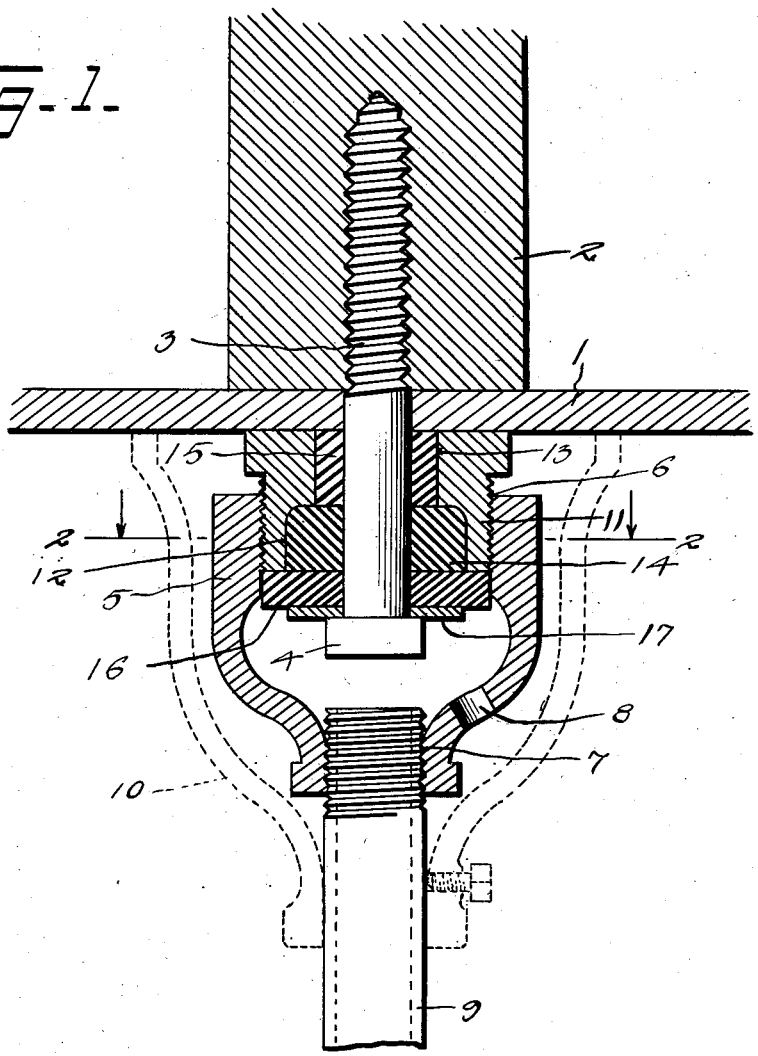
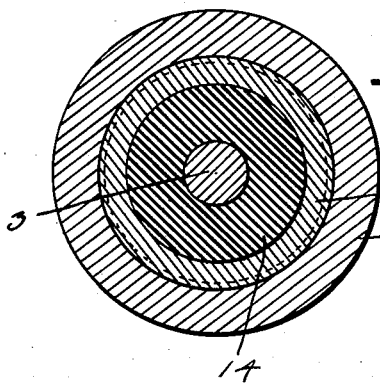
Inventor
J. B. Estabrook
By Watson E. Coleman
Attorney Patented Aug. 18, 1936

2,051,205

UNITED STATES PATENT OFFICE 2,051,205

INSULATING DEVICE

James Bailey Estabrook, Shreveport, La.

Application August 8, 1935, Serial No. 35,387

3 Claims. (Cl. 248—18)

This invention relates to the class of supports or hangers and pertains particularly to a support or hanger having shock absorbing qualities.

At the present time in the mounting of certain types of machines such as electric ventilating fans, the fans are suspended from a ceiling or other overhead support by means of a screw which is directly connected with a metal yoke to which the supporting shaft is attached. In this method of suspending fans, certain metal parts are in contact and when the fan is in operation, vibration of the same creates relative movement between these parts so that a certain amount of noise is developed.

The present invention has for its primary object to provide an improved hanger for electric fans or other suspended machines, in which a shock absorbing coupling is established between two parts so that vibrations developed by the fan will be absorbed and the development of noises prevented.

A further object of the invention is to provide an improved hanger employing the usual lag screw for engagement in a supporting body, and a yoke to which a suspension shaft may be attached, with a rubber coupling between the yoke and the lag screw so that some relative movement between the screw and yoke may take place without having metal move against metal and the development of noises.

A further object of the invention is to provide a suspension means of the above described character in which the torque developed in the starting of the suspended machine will be taken care of by the hanger instead of placing strain upon relatively non-resilient parts.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in vertical section through the hanger embodying the present invention showing the same in mounted position with a suspension shaft attached thereto;

Figure 2 is a sectional view taken on the line 2—2 of Figure 1.

Referring now more particularly to the drawing, the numerals 1 and 2 indicate respectively a portion of a ceiling and a portion of a ceiling joist.

The device embodying the present invention comprises a screw 3 which is of the type at present commonly employed and which has the head 4. The part 5 of the hanger is of the nature of a reducing coupling and may be referred to as the hanger yoke. This coupling or yoke is interiorly threaded at its upper end as indicated at 6 while the opposite end is drawn in to a reduced diameter and is also interiorly threaded, as indicated at 7. The wall of the coupling has an aperture 8 therethrough by which electric wires may be run into pass through the hanger pipe or tubular shaft 9 which is threadably attached at one end to the threaded portion 7 and carries an electric fan or other machine upon its lower end.

In practice the hanger or support constituting the present invention is shielded or housed in a canopy which is shown in dotted outline and is indicated by the numeral 10.

Threadably engaged in the larger end of the yoke or coupling 5 is a collar 11, the lower half of the interior of which is of larger diameter, as indicated at 12, than the upper half which is indicated by the numeral 13. The headed lower end of the lag screw is disposed axially within the collar 11 and passes through the rubber sleeves 14 and 15 which lie respectively in the portions 12 and 13 of the collar. Disposed against the lower end of the collar 11 is a rubber washer 16 which is relatively thick, as shown, and through the center of which the shank of the screw 3 passes, a metal plate 17 being disposed against the under side of this washer and engaged by the head 4 of the screw in the manner illustrated.

From the foregoing, it will be readily apparent that in the hanger herein disclosed, the yoke and collar 5 and 11 are completely separated from the screw 3 by rubber bodies which permits the yoke and collar to have a certain degree of movement without rubbing metal parts against the screw so as to cause friction of metal on metal and noises. This support permits vertical movement of the yoke, collar and suspension shaft 9 relative to the screw 3 and the ceiling or other support in which the screw is engaged, and also permits slight oscillatory movement of the yoke, collar and shaft by reason of the compressive quality of the rubber sleeves separating the screw from the suspended parts.

What is claimed is:—

1. A support of the character described, comprising a yoke member having one end interiorly threaded, means at the other end of the yoke member for attaching a suspension shaft thereto, a collar detachably engaged in the threaded end of the yoke member and having an interior passage formed in two coaxial portions one of which is of greater diameter than the other, the said portion of greatest diameter of the collar passage lying adjacent the end of the collar which is engaged in the yoke member, a suspension screw adapted to engage a supporting structure and having an end extended through the collar, and a pair of resilient sleeves encircling the said end of the screw and each fitting snugly within one of the portions of the collar, said sleeves forming a shock absorbing barrier between the screw and the collar.

2. A support of the character described, comprising a yoke member having one end interiorly threaded, means at the other end of the yoke member for attaching a suspension shaft thereto, a collar detachably engaged in the threaded end of the yoke member and having an interior passage formed in two coaxial portions one of which is of greater diameter than the other, the said portion of greatest diameter of the collar passage lying adjacent the end of the collar which is engaged in the yoke member, an elongated suspension element adapted for attachment at one end to a supporting body and having its other end extended axially through the collar and terminating in a head, a pair of sleeves of resilient material encircling the screw and each lying in one of said portions of the collar, and a washer of resilient material encircling the said end of the elongated member and engaging the inner end of the collar between the latter and the head of said member.

3. A support of the character described, comprising a yoke member having one end interiorly threaded, means at the other end of the yoke member for attaching a suspension shaft thereto, a collar detachably engaged in the threaded end of the yoke member and having an interior passage formed in two coaxial portions one of which is of greater diameter than the other, the said portion of greatest diameter of the collar passage lying adjacent the end of the collar which is engaged in the yoke member, a suspension screw adapted to engage a supporting structure and having an end extended through the collar, and a resilient material encircling the said end of the structure and filling the two portions of the collar, said material forming a shock absorbing barrier between the structure and the collar.

JAMES BAILEY ESTABROOK.